United States Patent [19]

Recker et al.

[11] 4,336,180

[45] Jun. 22, 1982

[54] SOLVENT-FREE POLYURETHANES WITH FIBROUS REINFORCING AGENTS

[75] Inventors: Klaus Recker, Cologne; Gerhard Grögler, Leverkusen, both of Fed. Rep. of Germany

[73] Assignee: Bayer Aktiengesellschaft, Leverkusen, Fed. Rep. of Germany

[21] Appl. No.: 246,816

[22] Filed: Mar. 23, 1981

[30] Foreign Application Priority Data

Apr. 3, 1980 [DE] Fed. Rep. of Germany ....... 3013263

[51] Int. Cl.³ .............................................. C08L 75/12
[52] U.S. Cl. ................................... 524/847; 525/454; 525/459; 523/310; 524/872; 524/874
[58] Field of Search ................. 260/37 N; 526/61, 62, 526/63, 64; 525/454, 459

[56] References Cited

U.S. PATENT DOCUMENTS 3,755,222 8/1973 Gruber et al. .................... 260/37 N
4,016,122 4/1977 Matsuda et al. .................... 525/454
4,251,427 2/1981 Recker et al. .................... 260/37 N

*Primary Examiner*—Lewis T. Jacobs
*Attorney, Agent, or Firm*—Gene Harsh; Joseph C. Gil

[57] ABSTRACT

The instant invention is directed to a substantially solvent-free molding material, comprising
(A) from 92 to 30% by weight, of an active-hydrogen containing prepolymer containing: from 0.3 to 4% by weight, based on the prepolymer, of free primary and/or secondary amino groups, from 1.5 to 10% by weight, based on the prepolymer, of urethane groups, and from 1.5 to 10% by weight, based on the prepolymer, of urea groups;
(B) from 24 to 1% by weight of a polyisocyanate having a melting point above 120° C.; and
(C) from 5 to 69% by weight of an organic or inorganic fibrous material with a fiber length of from 0.1 to 100 mm, the equivalent ratio between NCO groups, including masked NCO groups, and active H-atoms of components (A) and (B) is between 1:1 and 1:1.75. The instant invention is also directed to a process for the production of the substantially solvent-free molding material.

14 Claims, No Drawings

SOLVENT-FREE POLYURETHANES WITH FIBROUS REINFORCING AGENTS

BACKGROUND OF THE INVENTION

The present invention relates to solvent-free, thermosetting molding materials based on polyurethane which are stable in storage and contain a fibrous reinforcing material, and a process for their production.

Fiber-reinforced moldings may be produced according to prior art processes using many different synthetic polymers. Glass fibers have proved to be a particularly suitable reinforcing material. One example of such processes is the production of semifinished products which are stable in storage (sheet moulding compound, "prepregs", bulk moulding compounds) from resins containing unsaturated polyesters (abbreviated hereafter as "UP-resins") and glass fibers, which semifinished products may be molded using heated presses and cured into moldings of a very high strength and rigidity. However, this process has several disadvantages. The monomers (e.g., styrene) containing vinyl groups and usually used as a solvent for the UP-resins, lead during the radically initiated polymerization to a very high density of cross-linking which causes extreme brittleness and very high notched bar sensitivity of the molding. Moreover, the presence of solvents complicates processing since complicated procedures have to be carried out to remove the solvent vapors by suction, and antiexplosion processing installations are required.

In order to produce the semifinished product, the UP-resin must be thickened so that, in the subsequent heating/pressing process, the reinforcing fibers are uniformly transported to any place of the molding. For this purpose, mostly small quantities of an alkaline earth metal oxide or hydroxide are added to the resin, which initiate a protracted maturation process which usually lasts from 7 to 21 days and must be carried out in a so-called "maturation case" at a slightly elevated temperature. This intermediate treatment requires a considerable consumption of time and capital and impairs the efficiency of the process.

It is also known to reinforce polyurethane elastomers using fibrous materials. Thus, for example, glass fiber-reinforced polyurethane moldings may be produced by the injection molding or reaction injection molding process. However, the mechanical characteristics, in particular the flexural strength, of such moldings may only be increased to a certain extent, as the length of the fibrous material may not exceed from 1 to 6 mm approximately for processing reasons. A particular disadvantage is that, due to the limited fiber length, the thermal expansion coefficient of the reinforced polyurethane elastomers is still many times greater than the expansion coefficient of steel.

A process for the production of high molecular weight, cross-linked plastics is described in German Pat. No. 968,566, in which an intermediate product is produced initially from a polyester having hydroxyl groups, a glycol and an excess of diisocyanate. The intermediate product is then used to prepare semifinished products which are stable in storage, by reaction with an excess of a diisocyanate containing uretdione groups. These semifinished products may finally be molded and cured into elastic moldings by the effect of temperature.

The polyurethane elastomers described in German Pat. No. 968,566 do indeed have a high elasticity and tenacity, but their hardness and rigidity is insufficient for many uses. The use of a fibrous reinforcing material is not mentioned in German Pat. No. 968,566. In principle, glass fibers of a length of greater than 6 mm may indeed be incorporated in the intermediate product described above; however, the high viscosity of the intermediate product would necessitate the use of rolling mills or kneaders for mixing in the fibrous material and the uretdione diisocyanate required for cross-linking. These types of apparatus are conventional in rubber processing. However, when working in the fibrous material in this manner, such high shearing forces occur, under the conditions of the process, that the individual fibers become pulverized into fractions of their initial length so that the required effects of reinforcement on one hand and reduction of the thermal expansion coefficient on the other hand cannot be fully obtained.

An object of the invention is to provide new solvent-free, storage stable molding materials which may be cured into moldings having high rigidity, desirable impact strength and high dimensional stability as a result of pressing at elevated temperature.

This object is achieved using the molding materials provided according to the invention.

A further object of the invention is to provide a process using the molding materials to produce fiber-reinforced moldings having high rigidity, desirable impact strength and high dimensional stability and to produce them in economically acceptable periods of time, i.e., without protracted intermediate treatment of the preliminary molding. This object is achieved by the present process.

DESCRIPTION OF THE INVENTION

The present invention is directed to a molding material which is substantially free of solvent comprising:

(A) from 92 to 30% by weight, preferably from 87 to 32% by weight, based on (A)+(B)+(C), of a prepolymer having hydrogen atoms reactive towards isocyanates, with a viscosity of preferably at least 20 Pa.s/25° C., which contains from 0.3 to 4, preferably from 0.5 to 2% by weight, based on the prepolymer, of free primary and/or secondary amino groups, from 1.5 to 10% by weight, preferably from 5 to 7.5% by weight of urethane groups, -NH-CO-O- and from 1.5 to 10% by weight, preferably from 5 to 7.5% by weight of urea groups -NH-CO-NH- and optionally from 1 to 5% by weight, based on the prepolymer, of a molecular sieve of the sodium aluminosilicate type and from 0.1 to 5% by weight, based on the prepolymer, of one or more activators, (B) from 24 to 1% by weight, preferably from 18 to 2% by weight, based on (A)+(B)+(C), of a polyisocyanate having a melting point above 120° C., preferably above 150° C., and (C) from 5 to 69% by weight, preferably from 11 to 50% by weight, based on (A)+(B)+(C), of an organic or inorganic fibrous material having a fiber length of from 0.1 to 100 mm, preferably from 10 to 80 mm, and most preferably from 20 to 60 mm in which the NCO/active hydrogen equivalent ratio (including any masked NCO groups) of the components (A) and (B) is between 1:1 and 1:1.75.

A further object of the invention is a process for the production of a substantially solvent-free molding material or for further processing into a fiber-reinforced molding, based on polyurethane by a reaction between polyisocyanates and compounds having hydrogen atoms which are reactive towards isocyanates, in the presence of a fibrous reinforcing material, which process, comprises:

(I) reacting in a first stage, at a temperature of from 10° to 70° C., preferably from 20° to 50° C.,
(a) from 95 to 70% by weight, preferably from 90 to 75% by weight, based on the total of (a)+(b), of a prepolymer having NCO groups with
(b) from 5 to 30% by weight, preferably from 10 to 25% by weight, based on (a)+(b), of a compound having from 2 to 4, preferably 2, amino groups and a molecular weight of preferably less than 200, or an equivalent quantity thereto of water, optionally in the presence of
(c) from 1 to 5% by weight, based on (a)+(b), of a molecular sieve of the sodium aluminosilicate type and/or
(d) from 0.1 to 5% by weight, based on (a)+(b), of one or more activators, to form preliminary polymer (A), having from 0.3 to 4, preferably from 0.5 to 2% by weight of primary and/or secondary amino groups, from 1.5 to 10, preferably from 5 to 7.5% by weight, of urethane groups and from 1.5 to 10, preferably from 5 to 7.5% by weight of urea groups, wherein components (a) and (b) are liquid at the reaction temperature chosen and the equivalent ratio between the NCO groups of component (a) and the amino groups of component (b) is between 0.40:1 and 0.85:1, preferably between 0.50:1 and 0.80:1, most preferably between 0.60:1 and 0.75:1 and (II) adding to components (a) and (b) in a second stage during or before the polyaddition reaction from 1 to 24% by weight, preferably from 2 to 18% by weight, based on (A)+(B)+(C), of a polyisocyanate (B) having a melting point above 120° C., preferably above 150° C., and from 5 to 69% by weight, preferably from 11 to 50% by weight, based on (A)+(B)+(C), and a fibrous material (C) having a fiber length of from 0.1 to 100 mm, preferably from 10 to 80 mm, most preferably from 20 to 60 mm. At any later time, the intermediate product obtained which is stable in storage, may be cured with molding at a temperature above 90° C., preferably between 110° and 150° C., and at a pressure of between 10 and 300 bars.

In order to produce the polyamino compound (A), prepolymers (a) having NCO groups are reacted with compounds (b) having amino groups. As starting components in the production of the prepolymer having NCO groups, any polyisocyanates, preferably those which are liquid at room temperature, may be used as the isocyanate component. These include aliphatic, cycloaliphatic, araliphatic, aromatic and heterocyclic polyisocyanates, as described, for example, by Siefken in Justus Liebigs Annalen der Chemie, 562, pages 75 to 136, for example, those of the formula Q(NCO)$_n$ in which
n=from 2 to 4, preferably 2, and
Q represents an aliphatic hydrocarbon radical having from 2 to 18, preferably from 6 to 10 carbon atoms; a cycloaliphatic hydrocarbon radical having from 4 to 15, preferably from 5 to 10 carbon atoms; an aromatic hydrocarbon radical having from 6 to 15, preferably from 6 to 13 carbon atoms; or an araliphatic hydrocarbon radical having from 8 to 15, preferably from 8 to 13 carbon atoms.

Examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and any mixtures of these isomers; 1-isocyanato-3,3,5-trimethyl-5-isocyanato-methylcyclohexane (German Auslegeschrift No. 1,202,785 and U.S. Pat. No. 3,401,190); 2,4- and 2,6-hexahydrotoluylene diisocyanate and any mixtures of these isomers; hexahydro-1,3- and/or 1,4-phenylene diisocyanate; perhydro-2,4'- and/or 4,4'-diphenylmethane diisocyanate; 1,3- and 1,4-phenylene diisocyanate; 2,4- and 2,6-toluylene diisocyanate and any mixtures of these isomers; diphenylmethane-2,4'- and/or 4,4'-diisocyanate and naphthylene-1,5-diisocyanate.

The following are also included according to the invention by way of example: triphenyl methane-4,4',4''-triisocyanate; polyphenyl-polymethylene-polyisocyanates as obtained by aniline-formaldehyde condensation and subsequent phosgenation (British Pat. Nos. 874,430 and 848,671); m- and p-isocyanatophenyl sulfonyl isocyanates (U.S. Pat. No. 3,454,606); perchlorinated aryl polyisocyanates (German Auslegeschrift No. 1,157,601 or U.S. Pat. No. 3,277,138); polyisocyanates having carbodiimide groups (German Pat. No. 1,092,007, U.S. Pat. No. 3,152,162 and German Offenlegungsschriften Nos. 2,504,400; 2,537,685 and 2,552,350); norbornane diisocyanates (U.S. Pat. No. 3,492,330); polyisocyanates having allophanate groups (British Pat. Nos. 994,890, 761,626 and Dutch patent application No. 7,102,524); polyisocyanates having isocyanurate groups (U.S. Pat. No. 3,001,973, German Pat. Nos. 1,022,789; 1,222,067 and 1,027,394 and German Offenlegungsschriften Nos. 1,929,034 and 2,004,048); polyisocyanates having urethane groups (Belgian Pat. No. 752,261 or U.S. Pat. Nos. 3,394,164 and 3,644,457); polyisocyanates having acylated urea groups (German Pat. No. 1,230,778); polyisocyanates having biuret groups (U.S. Pat. Nos. 3,124,605; 3,201,372 and 3,124,605 and British Pat. No. 889,050); polyisocyanates produced by telomerization reactions (U.S. Pat. No. 3,654,106); polyisocyanates having ester groups (British Pat. Nos. 965,474 and 1,072,956, U.S. Pat. No. 3,567,763 and German Pat. No. 1,231,688); reaction products of the above isocyanates with acetals (German Pat. No. 1,072,385) and polyisocyanates containing polymeric fatty acid esters (U.S. Pat. No. 3,455,883).

It is also possible to use the distillation residues, which are obtained from the commercial production of isocyanates and which contain isocyanate groups, if desired dissolved in one or more of the previously mentioned polyisocyanates. Furthermore, it is possible to use any mixtures of the previously mentioned polyisocyanates.

The commercially available polyisocyanates are usually the most preferred, e.g., the 2,4- and 2,6-toluylene diisocyanate and any mixtures of these isomers ("TDI"); polyphenyl-polymethylene-polyisocyanates which are produced by aniline-formaldehyde condensation and subsequent phosgenation ("crude MDI") and polyisocyanates having carbodiimide groups, urethane groups, allophanate groups, isocyanurate groups, urea groups or biuret groups ("modified polyisocyanates"), in particular such modified plyisocyanates which are derived from 2,4- and/or 2,6-toluylene diisocyanate or from 4,4'- and/or 2,4'-diphenyl methane diisocyanate.

To produce the NCO-terminated prepolymers (a), compounds which are suitable for use as the polyol component are those compounds which are liquid at the reaction temperature, preferably those which are liquid below 30° C., having from 2 to 8 hydroxyl groups and a molecular weight of between 300 and 10,000, optionally a mixture of polyols having a molecular weight of between 1,000 and 10,000, or between 300 and 950. The preferred polyols having a molecular weight of from 2,000 to 8,000, in particular from 3,000 to 6,000, or a molecular weight of from 350 to 800, particularly from 400 to 600. Examples include: polyesters, polyethers, polythioethers, polyacetals, polycarbonates and polyester amides having from 2 to 8, but preferably from 2 to 4, hydroxyl groups. The polyesters which can be used which contain hydroxyl groups are, for example, the reaction products of polyhydric (preferably dihydric and optionally also trihydric) alcohols with polybasic (preferably dibasic) carboxylic acids. Instead of the free polycarboxylic acids, the corresponding polycarboxylic acid anhydrides or corresponding polycarboxylic acid esters of low molecular weight alcohols or mixtures thereof may also be used for the preparation of the polyesters. The polycarboxylic acids may be aliphatic, cycloaliphatic, aromatic and/or heterocyclic and may be substituted, e.g., by halogen atoms, and/or unsaturated.

The following are mentioned as examples of such carboxylic acids and the derivatives thereof: succinic acid, adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylenetetrahydrophthalic acid anhydride; glutaric acid anhydride; maleic acid; maleic acid anhydride; fumaric acid; dimerized and trimerized unsaturated fatty acids, which may be in admixture with monomeric unsaturated fatty acids such as oleic acid; terephthalic acid dimethyl ester and terephthalic acid-bis glycol ester. Polyhydric alcohols include, for example, ethylene glycol; propylene glycol-(1,2) and (1,3); butylene glycol-(1,4) and (2,3); hexane diol-(1,6); octane diol-(1,8); neopentyl glycol; 1,4-bis-hydroxymethyl cyclohexane; 2-methyl-1,3-propane diol; glycerine; trimethylol propane; hexane triol-(1,2,6); butane triol-(1,2,4); trimethylol ethane; pentaerythritol; quinitol; mannitol and sorbitol; formitol; methyl glycoside; diethylene glycol; triethylene glycol; tetraethylene glycol and higher polyethylene glycols; dipropylene glycol and higher polypropylene glycols and dibutylene glycol and higher polybutylene glycols. The polyesters may contain a proportion of terminal carboxyl groups. Polyesters of lactones, e.g. ε-caprolactone, or of hydroxy carboxylic acids, e.g., ω-hydroxy caproic acid, may also be used.

The polyethers which may be used have at least two, usually from 2 to 8, preferably 2 or 3, hydroxyl groups and are prepared by polymerization of epoxides (such as ethylene oxide; propylene oxide; butylene oxide; tetrahydrofuran, styrene oxide or epichlorohydrin) with themselves (e.g., in the presence of Lewis catalysts such as boron trifluoride) or by adding these epoxides (preferably ethylene oxide and propylene oxide, either in admixture or successively) to starting components having reactive hydrogen atoms (such as water, alcohols, ammonia or amines). The preferred components having reactive hydrogen atoms are ethylene glycol; propylene glycol-(1,3) or (1,2); trimethylol propane; glycerine, sorbitol; 4,4'-dihydroxy-diphenyl propane; aniline; ethanolamine or ethylene diamine. Sucrose polyethers, as described, for example, in German Auslegeschriften Nos. 1,176,358 and 1,064,938, and also polyethers started on formitol or formose (German Offenlegungsschriften Nos. 2,639,083 or 2,737,951), can also be used. The polyethers which have predominantly, as much as 90% by weight, based on all the hydroxyl groups present in the polyether, primary hydroxyl groups, are preferred. Polybutadienes having hydroxyl groups are also suitable for use according to the invention.

Among the polythioethers, the autocondensation products of thiodiglycol and/or its condensation products with other glycols, dicarboxylic acids, formaldehyde, amino carboxylic acids or amino alcohols are particularly suitable. Depending on the co-components, the products are, e.g., polythio mixed ethers, polythio ether esters or polythio ether ester amides.

Examples of polyacetals are the compounds which may be prepared from glycols, such as diethylene glycol; triethylene glycol, 4,4'-dioxethoxy diphenyl dimethyl methane; hexane diol and formaldehyde. Polyacetals which can be used according to the invention may also be prepared by polymerizing cyclic acetals, such as trioxane (German Offenlegungsschrift No. 1,694,128).

Polycarbonates which may be used include those which may be prepared, for example, by reacting diols (such as propane diols-(1,3); butane diol-(1,4) and/or hexane diol-(1,6); diethylene glycol; triethylene glycol; tetraethylene glycol or thiodiglycol) with diaryl carbonates, e.g., diphenyl carbonate, or phosgene (German Auslegeschriften Nos. 1,694,080, 1,915,908 and 2,221,751 or German Offenlegungsschrift No. 2,605,024).

Among the polyester amides and polyamides are, for example, the predominantly linear condensates, obtained from polybasic saturated or unsaturated carboxylic acids of the anhydrides thereof and polyhydric saturated or unsaturated amino alcohols, diamines, polyamines and mixtures thereof.

Polyhydroxyl compounds already containing urethane or urea groups and also optionally modified natural polyols, such as castor oil or carbohydrates, e.g., starch, may also be used. Moreover, addition products of alkylene oxides to phenol-formaldehyde resins and also addition products of alkylene oxides to urea-formaldehyde resins may be used according to the invention.

The polyhydroxyl compounds mentioned may still be modified in a variety of ways before being used in the polyisocyanate-polyaddition process. For example, according to German Offenlegungsschriften No. 2,210,839 (U.S. Pat. Nos. 3,849,515) and 2,544,195, a mixture of different polyhydroxyl compounds (e.g., of a polyether polyol and a polyester polyol) may be condensed into a higher molecular weight polyol by etherification in the presence of a strong acid, which higher molecular weight polyol is formed from different segments connected via ether bridges. It is also possible to introduce amide groups into the polyhydroxyl compounds (German Offenlegungsschrift No. 2,559,372) or to introduce triazine groups by a reaction with polyfunctional cyanuric acid esters (German Offenlegungsschrift No. 2,620,487). By reacting a polyol with a less than equivalent quantity of a diisocyanato-carbodiimide and subsequent reaction of the carbodiimide group with an amine, amide, phosphite or a carboxylic acid, polyhydroxyl compounds having guanidine groups, phosphono formamidine groups or acyl urea groups are obtained (German Offenlegungsschriften Nos. 2,714,289, 2,714,292 and 2,714,293). In some cases, it is particularly useful to convert the higher molecular weight polyhydroxyl compounds completely or partially into the corresponding anthranilic acid esters by a reaction with isatoic acid anhydride (German Offenlegungsschriften Nos. 2,019,432 and 2,619,840 or U.S. Pat. Nos. 3,808,250; 3,975,428 and 4,016,143). High molecular weight compound having terminal aromatic amino groups are thus obtained.

Higher molecular weight compounds having terminal amino groups are obtained by reacting NCO-prepolymers with enamines, aldimines or ketimines having hydroxyl groups and by subsequent hydrolysis (German Offenlegungsschrift No. 2,546,536 or U.S. Pat. No. 3,865,791). Other processes for the production of higher molecular weight compounds having terminal amino groups or hydrazide groups are described in German Offenlegungsschrift No. 1,694,152 (U.S. Pat. No. 3,625,871).

According to the invention, polyhydroxyl compounds which contain high molecular weight polyadducts or polycondensates or polymers in a finely dispersed or dissolved form may also be used. Polyhydroxyl compounds of this type are obtained, for example, when polyaddition reactions (e.g., reactions between polyisocyanates and amino-functional compounds), or polycondensation reactions (e.g., between formaldehyde and phenols and/or amines), are allowed to take place in situ in the above-mentioned compounds containing hydroxyl groups. Such processes are described, for example, in German Auslegeschriften Nos. 1,168,075 and 1,260,142 and in German Offenlegungsschriften Nos. 2,324,134; 2,423,984; 2,512,385; 2,513,815; 2,550,796; 2,550,797, 2,550,833; 2,550,862; 2,633,293 and 2,639,254. However, it is also possible according to U.S. Pat. No. 3,869,413 or German Offenlegungsschrift No. 2,550,860, to mix a finished aqueous polymer dispersion with a polyhydroxyl compound and then to remove the water from the mixture.

Polyhydroxyl compounds modified by vinyl polymers, which are obtained, for example, by polymerizing styrene and acrylonitrile in the presence of polyethers (U.S. Pat. Nos. 3,383,351; 3,304,273; 3,523,093 and 3,110,695 or German Auslegeschrift No. 1,152,536) or polycarbonate polyols (German Pat. No. 1,769,795 or U.S. Pat. No. 3,637,909) are also suitable for use in the present process. When using polyether polyols which were modified according to German Offenlegungsschriften Nos. 2,442,101; 2,644,922 and 2,646,141 by graft polymerization with vinyl phosphonic acid esters and optionally (meth)acrylonitrile, (meth)acrylicamide or OH-functional (meth)acrylic acid esters, plastics are obtained having a particular nonflammability. Polyhydroxyl compounds, in which carboxyl groups are introduced by radical graft polymerization using unsaturated carboxylic acids and optionally also other olefinically unsaturated monomers (German Offenlegungsschriften Nos. 2,714,291; 2,739,620 and 2,654,746), may be used, particularly advantageously combined with mineral fillers.

When using modified polyhydroxyl compounds of the type mentioned above as the starting component in the polyisocyanate-polyaddition process, polyurethane plastics having substantially improved mechanical characteristics are often produced.

Examples of the mentioned compounds to be used according to the invention are described, for example, in High Polymers, Vol. XVI, "Polyurethanes, Chemistry and Technology," by Saunders-Frisch, Interscience Publishers, New York, London, Vol. I, 1962, pages 32–42 and 44–54 and Vol. II, 1964, pages 5–6 and 198–199, and in Kunststoff-Handbuch, Vol. VII, Vieweg-Höchtlen, Carl-Hanser-Verlag, Munich, 1966, e.g., on pages 45–71. Mixtures of the above compounds containing at least two hydrogen atoms which are reactive towards isocyanates, having a molecular weight of from 300 to 10,000, e.g., mixtures of polyethers and polyesters may, of course, be used.

In the preparation of the prepolymer (a), a proportion of low molecular weight chain lengthening agents may optionally also be used, for example: ethylene glycol; propylene glycol-(1,2) and (1,3); butylene glycol-(1,4) and (2,3); pentane diol-(1,5); hexane diol-(1,6); octane diol-(1,8); neopentyl glycol; 1,4-bis-hydroxymethyl-cyclohexane; 2-methyl-1,3-propane diol; dibromobutene diol (U.S. Pat. No. 3,723,392); glycerine, trimethylol propane; hexanetriol-(1,2,6); trimethylol ethane; pentaerythritol; quinitol; mannitol and sorbitol; castor oil; diethylene glycol; triethylene glycol; tetraethylene glycol; higher polyethylene glycols with a molecular weight of up to 300; dipropylene glycol; higher polypropylene glycols with a molecular weight of up to 300; dibutylene glycol; higher polybutylene glycols with a molecular weight of up to 300; 4,4'-dihydroxy-diphenylpropane; dihydroxymethyl-hydroquinone; ethanolamine; diethanolamine; N-methyldiethanolamine; triethanolamine and 3-aminopropanol.

As low molecular weight polyols, the mixtures of hydroxyaldehydes and hydroxyketones ("formose") or the polyhydric alcohols ("formitol"), obtained therefrom by reduction, may also be used, as produced in the autocondensation of formaldehyde hydrate in the presence of metallic compounds as the catalyst and compounds capable of enediol formation as the co-catalyst (German Offenlegungsschriften Nos. 2,639,084; 2,714,084; 2,714,104; 2,721,186; 2,738,154 and 2,738,512). In order to obtain plastics having improved non-flammability, these formoses are advantageously used combined with aminoplast formers and/or phosphites (German Offenlegungsschriften Nos. 2,738,513 and 2,738,532). Solutions of polyisocyanate-polyaddition products, particularly polyurethane ureas having ionic groups and/or polyhydrazo dicarbonamides in low molecular weight polyhydric alcohols are included as the polyol component (German Offenlegungsschrift No. 2,638,759).

It is advantageous for some purposes to use polyols which contain sulfonate groups and/or phosphonate groups (German Offenlegungsschrift No. 2,719,372), preferably the adduct of bisulfite to butene diol-1,4, or the alkoxylation products thereof.

The compounds having at least two amino groups, to be used as component (b) in the preparation of prepolymer (A) having amino groups are, for example, aliphatic and/or aromatic diamines.

The following are suitable aliphatic diamines: ethylene diamine; 1,4-tetramethylene diamine; 1,11-undecamethylene diamine; 1,12-dodecamethylene diamine and mixtures thereof; 1-amino-3,3,5-trimethyl-5-aminomethyl cyclohexane ("isophoronediamine"); 2,4- and 2,6-hexahydrotoluylene diamine and mixtures thereof; perhydro-2,4' and 4,4'-diaminodiphenyl methane; p-xylylene diamine; bis-(3-aminopropyl)-methylamine; diamino-perhydroanthracene (German Offenlegungsschrift No. 2,638,731) and cycloaliphatic triamines according to German Offenlegungsschrift No. 2,614,244. Hydrazine and substituted hydrazines, e.g., methyl hydrazine, N,N'-dimethyl hydrazine and homologues thereof. Acidic dihydrazides can also be used according to the invention, e.g., carbodihydrazide; oxalic acid dihydrazide; the dihydrazides of malonic acid, succinic acid, glutaric acid, adipic acid, β-methyladipic acid, sebacic acid, hydracyclic acid and terephthalic acid; semicarbazido-alkylene-hydrazides, e.g., β-semicarbazido-propionic acid hydrazide (German Offenlegungsschrift No. 1,770,591); semicarbazido-alkylene carbazine ester, e.g., 2-semicarbazidoethyl-carbazine ester (German Offenlegungsschrift No. 1,918,504) or amino semicarbazide compounds, e.g., β-aminoethyl-semicarbazido-carbonate (German Offenlegungsschrift No. 1,902,931). In order to control their reactivity, the amino groups may be completely or partially blocked by aldimine or ketimine groups (U.S. Pat. No. 3,734,894 or German Offenlegungsschrift No. 2,637,115).

The following are mentioned as examples of aromatic diamines: bisanthranilic acid ester (German Offenlegungsschriften Nos. 2,040,644 and 2,160,590); 3,5- and 2,4-diaminobenzoic ester (German Offenlegungsschrift No. 2,025,900); diamines containing ester groups (German Offenlegungsschriften Nos. 1,803,635; 2,040,650 and 2,160,589 or U.S. Pat. No. 3,681,290 and 3,736,360); diamines containing ether groups (German Offenlegungsschriften Nos. 1,770,525 and 1,809,172 or U.S. Pat. Nos. 3,654,364 and 3,736,295); which may be substituted in the 5-position 2-halo-1,3-phenylenediamines (German Offenlegungsschriften Nos. 2,001,772; 2,025,896 and 2,065,869): 3,3'-dichloro-4,4'-diaminodiphenyl methane; toluylene diamine; 4,4'-diaminodiphenyl methane; 4,4'-diamino-diphenyl disulfides (German Offenlegungsschrift No. 2,404,976); diaminodiphenyl dithioether (German Offenlegungsschrift No. 2,509,404); aromatic diamines substituted by alkyl thio groups (German Offenlegungsschrift No. 2,638,760); diaminobenzene phosphonic acid ester (German Offenlegungsschrift No. 2,459,491) and aromatic diamines containing sulfonate or carboxylate groups (German Offenlegungsschrift No. 2,720,166). Examples of aliphatic-aromatic diamines are aminoalkylthio anilines (German Offenlegungsschrift No. 2,734,574).

Zeolites, available commercially in the form of molecular sieves, may for example be used according to the invention as the sodium alumino silicates.

Activators which are suitable according to the invention are polyurethane catalysts, e.g., tertiary amines, such as triethyl amine; tributyl amine; N-methyl-morpholine; N-ethylmorpholine; N,N,N',N'-tetramethyl-ethylene diamine; pentamethyldiethylene triamine and higher homologues (German Offenlegungsschriften Nos. 2,624,527 and 2,624,528); 1,4-diazabicyclo-(2,2,2)-octane; N-methyl-N'-dimethyl-aminoethylpiperazine; bis-(dimethylaminoalkyl)-piperazines (German Offenlegungsschrift No. 2,636,787); N,N-dimethyl-benzyl amine; N,N-dimethylcyclohexyl amine; N,N-diethylbenzyl amine; bis-(N,N-diethylaminoethyl) adipate; N,N,N',N'-tetramethyl-1,3-butane diamine; N,N-dimethyl-β-phenylethyl amine; 1,2-dimethyl imidazole; 2-methyl imidazole; monocyclic and bicyclic amidines (German Offenlegungsschrift No. 1,720,633); bis-(dialkyl amino) alkyl-ethers (U.S. Pat. No. 3,330,782; German Auslegeschrift No. 1,050,588 and German Offenlegungsschriften Nos. 1,804,361 and 2,618,280) and tertiary amines having amide groups, preferably form-amide groups (German Offenlegungsschriften Nos. 2,523,633 and 2,732,292). Mannich bases of secondary amines (such as dimethyl amine), and aldehydes (preferably formaldehyde), or ketones (such as acetone), methyl ethyl ketones or cyclohexanone and phenols (such as phenol, nonyl phenyl or bisphenol) may also be used as catalysts.

Tertiary amines having hydrogen atoms active towards isocyanate groups, which can be used as catalysts include, e.g., triethanolamine; triisopropanolamine; N-methyl-diethanolamine; N-ethyl-diethanolamine; N,N-dimethyl-ethanolamine; the reaction products thereof with alkylene oxides (e.g., propylene oxide and/or ethylene oxide) and secondary/tertiary amines according to German Offenlegungsschrift No. 2,732,292.

Sila-amines having carbon-silicon bonds (German Pat. No. 1,229,290 or U.S. Pat. No. 3,620,984) are also included as catalysts, e.g., 2,2,4-trimethyl-2-silamorpholine and 1,3-diethylaminomethyl-tetramethyl-disiloxane.

Nitrogenous bases (such as tetra-alkyl ammonium hydroxides), alkali hydroxides (such as sodium hydroxide), alkali phenolates (such as sodium phenolate) or alkali alcoholates (such as sodium methylate) may also be used as catalysts. Hexahydrotriazines may also be used as catalysts (German Offenlegungsschrift No. 1,769,043).

The reaction between NCO groups and Zerewitinoffactive hydrogen atoms is greatly accelerated by lactams and azalactams, an associate between the lactam and the compound having acidic hydrogen being developed initially. Associates of this type and their catalytic effect are described in German Offenlegungsschriften Nos. 2,062,288; 2,062,289; 2,117,576 (U.S. Pat. Nos. 3,758,444); 2,129,198; 2,330,175 and 2,330,211.

Organo-metallic compounds, particularly organo tin compounds may also be used according to the invention as catalysts. As organo tin compounds, apart from sulfurous compounds such as di-n-octyl-tin-mercaptide (German Auslegeschrift No. 1,769,367; U.S. Pat. No. 3,645,927), tin(II)-salts of carboxylic acids (such as tin-(II)-acetate, tin(II)-octoate, tin(II)-ethyl hexoate and tin(II)-laurate), and the tin(IV)-compounds (e.g., dibutyl tin oxide, dibutyl tin dichloride, dibutyl tin diacetate, dibutyl tin dilaurate, dibutyl tin maleate or dioctyl tin diacetate) are preferably used.

All of the catalysts mentioned above may be used as mixtures. Among such mixtures, combinations of organo metallic compounds and amidines, amino pyridines or hydrazino pyridines (German Offenlegungsschriften Nos. 2,434,185; 2,601,082 and 2,603,834) are of particular interest.

Other examples of catalysts to be used according to the invention and also details concerning the effect of the catalysts are described in the Kunststoff-Handbuch, Vol. VII, published by Vieweg and Höchtlen, Carl-Hanser-Verlag, Munich, 1966, e.g., pages 96 to 102.

Acidically reacting substances such as hydrochloric acid or organic acid halogenides may also be used. Pigments or dyes and flameproofing agents, e.g., trischloroethyl phosphate, tricresyl phosphate or ammonium phosphate and ammonium polyphosphate may also be used. Stabilizers against ageing and atmospheric influences, softeners and fungistatically and bacteriostatically acting substances such as fillers (e.g., barium sulfate, kieselguhr, carbon black or whiting) may also be used.

Other examples of additives which may also be used according to the invention, and details concerning the use and effect of these additives are described in the Kunststoff-Handbuch, Vol. VII, published by Vieweg and Höchtlen, Carl-Hanser-Verlag, Munich, 1966, e.g., on pages 103 to 113.

Any polyisocyanates and, in particular, diisocyanates, having a melting point above 120° C., preferably above 150° C., can be used as component (B) of the molding materials according to the invention. Examples of these include: 1,4-dichloro-2,5-diisocyanato benzene; 1-chloro-4-methoxy-2,5-diisocyanato benzene; 1,3-dimethoxy-4,6-diisocyanato benzene; 2,5,2',5'-tetramethyl-4,4'-diisocyanato-diphenyl methane; diphenyl sulfone-4,4'-diisocyanate; naphthylene-1,5-diisocyanate and the urea diisocyanate of 1 mol of water and 2 mols of 2,4-toluylene diisocyanate (see German Offenlegungsschrift No. 2,902,469). The three last-mentioned diisocyanates are preferred.

The high melting polyisocyanate is preferably crushed to a particle size of $<40\mu$ before it is used.

Any inorganic and/or organic fibrous reinforcing materials can be used as component C, e.g., glass fibers (preferably in lengths of between 20 and 60 mm), graphite fibers and asbestos fibers. Fibrous materials which originate from an organic polymer, e.g., from a polyester, polyethylene terephthalate or a polyamide, such as polyhexamethylene adipamide or polycaprolactam may also be used. These fibrous materials may be present, e.g., as a cloth, mat, band, cord or continuous fibers or as chopped-up staple fibers. According to the invention, glass fibers are preferred which are finished with dressings which give the fibers an affinity for polyurethanes (e.g., German Auslegeschriften Nos. 2,426,657 and 2,426,654).

The quantity of fibrous material which is to be incorporated depends on the required improvement in the mechanical characteristics of the molding. From 5 to 69% by weight of fibrous material, based on the total weight of the fiber-reinforced molding, is generally used.

In addition to the fibrous materials, other additives may also be present, e.g., fillers in particle form (such as chalk, carbon black, clay, iron oxide, mica, siliceous materials, titanium dioxide and dye pigments), lubricants and release agents such as tin stearate and ultraviolet absorbers and the like.

Carrying out of the process according to the invention

Component (B) is preferably used suspended in component (a). The equivalent ratio of component (A) to component (b) depends on one hand on the functionality of the NCO-prepolymer (a) and, on the other hand, on the number of groups reactive towards isocyanates in component (b) A relatively high degree of branching necessitates a low equivalent ratio in order to give the prepolymer (A) and therefore the molding material, a viscosity value which is suitable for further processing. Conversely, low branching must be compensated for by a higher equivalent ratio. In general, with an equivalent ratio of $\leq 0.5:1$, the average functionality of components (b) and (a) should be $\geq 2.1$. With an equivalent ratio of $\geq 0.65:1$, the average functionality should be $\leq 2.4$. By mixing the suspension of component (B) in component (a) with component (b), the polyaddition reaction between the reaction groups of (b) and the prepolymer (a) present in the liquid phase is started.

The fibrous materials (C) may now be worked in kneaders (SMC-Compounding Machine); for example, according to the conventional technology for UP-resins. The fibers may also be advantageously mixed in a double screw kneading machine.

The time until the storable, thermopressable intermediate product is obtained (maturation time) is from a few minutes to a few hours according to the temperature, quantity of activator and choice of starting materials. During this time, the prepolymer (A) containing amino groups is formed, surprisingly without substantial reaction of the high-melting polyisocyanate (B), as may be determined by titration of the total NCO-content with n-dibutyl amine.

After the maturation time has elapsed, the molding materials according to the invention have, depending on temperature, a storage stability of at least 10 days which is suitable for practical requirements. When atmospheric moisture is excluded and the temperature is maintained below 20° C., the storage stability amounts to several months. During this time, the molding materials may be molded using temperatures above 90° C., preferably between 110° and 150° C., and pressures between 10 and 300 bars, and may be cured into moldings within approximately from 1 to 10 minutes. The resulting moldings have desirable impact strength and dimensional stability, with comparatively high flexural strength.

The following Examples illustrate the present invention. Unless otherwise indicated, amounts are to be understood as parts by weight or percent by weight.

EXAMPLES

EXAMPLE 1

Component I 85.1 parts of a prepolymer containing NCO groups, formed by reacting a linear polypropylene glycol (molecular weight 2,000) with 2,4-toluylene diisocyanate in the molar ratio of 1:8 and removing the excess diisocyanate through thin films, having an NCO content of 4.1%.

14.9 parts of urea diisocyanate, formed from 1 mol of water and 2 mols of 2,4-toluylene diisocyanate, having an NCO content of 25.0%.

Component II 12.6 parts of diethyl toluylene diamine.

0.1 part of a 33% solution of diazabicyclo octane in dipropylene glycol.

0.015 part of a 24% solution of lead (II) octoate in white spirit (a petroleum destillate with boiling points between 135° and 200° C. consisting essentially of saturated aliphatic hydrocarbons).

Component III 55 parts of glass robings of a conventional glassfiber having a diameter of from 11 to 14$\mu$ which is sized with polyvinyl acetate as the film former; two thirds being cut to 52 mm, one third cut to 26 mm in length.

(a) Production of the sheet molding compound according to the invention

Components I and II are first mixed together homogeneously in the ratio stated by means of suitable metering and mixing equipment consisting of a Moynopump for component I, a geor-pump for component II and a mixing head with mechanical stirrer. The reactive composition is spread out with a doctor on a polyethylene film in a thickness of from 1 to 2 mm. The pot life of doctor time is approximately 2 minutes.

The glass rovings are then sprinkled onto the spread out layer and are covered with a second layer of the reactive composition which is also spread out with a doctor on a polyethylene film. The glass fibers can then easily be impregnated by means of fluted pressure rollers. At the end of the prepolymer reaction, which takes place at room temperature, the polyethylene film may be removed from the resinous mat.

In order to measure the viscosity of component (A), the preliminary polymer (a) is mixed with the diamine (B) in the quantities stated according to Example 1, and cast onto a polyethylene film and covered with a second film.

After storage for three days, the viscosity is determined in a high pressure piston viscosimeter HKV 2000 (firm: Göttfert, BRD). It amounts to $1.9 \times 10^8$ mPas/25° C.

(b) Production of a molding

In order to produce moldings, parts corresponding to the respective mold are cut out of the mat and pressed at 120° C. and 75 bars. Curing is carried out, depending on the layer thickness, in from 3 to 10 minutes. The part produced may then be removed hot from the mold. It is also possible to introduce several superimposed layers into the mold as the material intermingles homogeneously during the molding cycle. Also, where there are comparatively long flow paths, the glass fibers are allowed to be easily transported right into the most extreme corners of the molding. With the exclusion of atmospheric moisture, molding materials produced according to (a) and stored at below 20° C. could also be processed even after several months.

The following characteristics were measured on the cured test panels, produced as described under (b):

| Test figures without glass fibers (comparison) | | |
|---|---|---|
| Density according to DIN 53479 | 1.08 | Mg/m$^3$ |
| Hardness Shore A/D according to DIN 53505 | 90/37 | |
| Tensile strength according to DIN 53504 | 9.3 | MPa |
| Elongation at break according to DIN 53504 | 275 | % |
| Tear strength according to DIN 53515 | 26.5 | KN/m |
| Flexural modulus according to ASTM D 790-71 | 47 | MPa |
| Length expansion coefficient according to VDE 0304/part 1 | 240 | $10^{-6}$ degree$^{-1}$ |
| Test figures with glass fibers | | |
| Density according to DIN 53479 | 1.32 | Mg/m$^3$ |
| Tensile strength according to DIN 53504 | 40 | MPa |
| Elongation at break according to DIN 53504 | 22 | % |
| Tear strength according to DIN 53515 | 262 | KN/m |
| Flexural modulus according to ASTM D 790-71 | 1010 | MPa |
| Length expansion coefficient according to VDE 0304/part 1 | 10 | $10^{-6}$ degree$^{-1}$ |
| Mo-2193 Le A 20,266 Cold impact strength at −30° C. | | |
| according to DIN 53453 | 75 | KJ/m$^2$ |

EXAMPLE 2

Component I:

88 parts of the prepolymer containing NCO groups used in Example 1.

12 parts of the urea diisocyanate used in Example 1.

Component II:

12.4 parts of diethyltoluylene diamine.

Component III 74.9 parts of chopped strands 6 mm in length from a conventional glassfiber having a diameter of from 11 to 14μ which is sized according to Example 1 of German Auslegeschrift No. 2,426,657.

In order to produce the molded masses according to the invention, a double screw-kneading machine (product USK 53 v, of Werner and Pfleiderer, BRD) is used. The length of the part in which the process takes place is approximately 42 times the diameter of the screw shaft which amounts to 53 mm. The same screw shaft equipment, with the portion carrying the kneading element amounting to about 20%, is used in all the Examples. The screw extruder consists of 12 housings, the first being equipped with a feed hopper. The function and mode of operation of the screw extruder and of the kneading and conveying elements of the shaft equipped, and the like, are described fully in the trade catalogues by Werner & Pfleiderer and in German Offenlegungsschrift No. 2,302,564 (U.S. Pat. No. 3,963,679).

Component I is metered via a toothed wheel pump and Component II is metered by a Bosch pump. The glass fibers pass via a double metering screw and funnel into the casing 1, the isocyanate suspension I is fed into the casing 2, the diamine II is fed into the casing 6 of the kneading machine. The extruded material which is approximately 45° C. in temperature is received on a polyethylene film and covered with a second film. After ripening for 2 hours, test panels are pressed as described in Example 1.

| Test figures without glass fibers (comparison) | | |
|---|---|---|
| Density according to DIN 53479 | 1.08 | Mg/m$^3$ |
| Hardness Shore A/D according to DIN 53505 | 89/35 | |
| Tensile strength according to DIN 53504 | 8.7 | MPa |
| Elongation at break according to DIN 53504 | 290 | % |
| Tear strength according to DIN 53515 | 22 | KN/m |
| Flexural modulus according to ASTM D 790-71 | 42 | MPa |
| Length expansion coefficient according to VDI 0304/part 1 | 223 | .$10^{-6}$ degree$^{-1}$ |
| Test figures with glass fibers | | |
| Density according to DIN 53479 | 1.30 | Mg/m$^3$ |
| Tensile strength according to DIN 53504 | 16.3 | MPa |
| Elongation at break according to DIN 53504 | 29 | % |
| Tear strength according to DIN 53515 | 90 | KN/m |
| Flexural modulus according to ASTM D 790-71 | 400 | MPa |
| Length expansion coefficient | | |

| | | |
|---|---|---|
| -continued | | |
| according to VDI 0304/part 1 | 25 | $.10^{-6}$ degree$^{-1}$ |
| Cold impact strength at $-30°$ C. according to DIN 53453 | | unbroken |

What is claimed is:

1. A substantially solvent-free molding material, comprising
    (A) from 92 to 30% by weight, of an active-hydrogen containing prepolymer containing: from 0.3 to 4% by weight, based on the prepolymer, of free primary and/or secondary amino groups, from 1.5 to 10% by weight, based on the prepolymer, of urethane groups, and from 1.5 to 10% by weight, based on the prepolymer, of urea groups;
    (B) from 24 to 1% by weight of a polyisocyanate having a melting point above 120° C.; and
    (C) from 5 to 69% by weight of an organic or inorganic fibrous material with a fiber length of from 0.1 to 100 mm,
the equivalent ratio between NCO groups, including masked NCO groups, and active H-atoms of components (A) and (B) is between 1:1 and 1:1.75.

2. The molding material of claim 1, wherein component (A) contains from 0.5 to 2% by weight of amino groups.

3. The molding material of claim 1, wherein component (A) contains from 5 to 7.5% by weight of urethane groups.

4. The molding material of claim 1, wherein component (A) contains from 5 to 7.5% by weight of urea groups.

5. The molding material of claim 1, wherein component (B) has a melting point above 150° C.

6. The molding material of claim 5, wherein component (B) is a urea diisocyanate of 1 mol of water and 2 mols of 2,4-toluylene diisocyanate.

7. The molding material of claim 1, wherein component (C) is a glass fiber material having a length of from 20 to 60 mm.

8. The molding material of claim 1, wherein component (A) is present in an amount of from 87 to 32% by weight, component (B) is present in an amount from 18 to 2% by weight, and component (C) is present in an amount of from 11 to 50% by weight.

9. The molding material of claim 1, wherein component (A) further comprises from 1 to 5% by weight, based on the prepolymer, of a molecular sieve of the sodium aluminosilicate type and/or from 0.1 to 5% by weight, based on the prepolymer, of one or more activators.

10. A process for the production of a substantially solvent-free molding material, comprising:
    (I) reacting at a temperature of from 10° to 70° C.,
        (a) from 95 to 70% by weight, based on the total of (a)+(b), of a prepolymer having NCO groups with
        (b) from 5 to 30% by weight, based on (a)+(b) of a compound having from 2 to 4 amino groups or an equivalent quantity thereto of water, optionally in the presence of
        (c) from 1 to 5% by weight, based on (a)+(b) of a molecular sieve of the sodium aluminosilicate type and/or
        (d) from 0.1 to 5% by weight, based on (a)+(b) of one or more activators,
    to form prepolymer A, having from 0.3 to 4% by weight of primary and/or secondary amino groups, from 1.5 to 10% by weight of urethane groups and from 1.5 to 10% by weight of urea groups, wherein components (a) and (b) are liquid at the reaction temperature chosen and the equivalent ratio between the NCO groups of component (a) and the amino groups of component (b) is between 0.40:1 and 0.85:1, (II) and adding to components (a) and (b) before or during the polyaddition reaction, from 1 to 24% by weight, based on (A)+(B)+(C), of a polyisocyanate (B) having a melting point above 120° C. and from 5 to 69% by weight, based on (A)+(B)+(C), of a fibrous material (C) with a fiber length of from 0.1 to 100 mm.

11. The process of claim 10, wherein component (B) is used suspended in component (a) and the fibrous material (C) is worked in with the components (a) and (b) during the course of the polyaddition reaction.

12. The process of claim 10, wherein component (a) is present in an amount of from 90 to 75%, by weight, and component (b) is present in an amount of from 10 to 25%, by weight.

13. A process for the production of fiber-reinforced moldings based on polyurethane, comprising curing at a temperature above 90° C. and at a pressure of between 10 and 300 bars a substantially solvent-free molding material, comprising
    (A) from 92 to 30% by weight, of an active-hydrogen containing prepolymer containing: from 0.3 to 4% by weight, based on the prepolymer, of free primary and/or secondary amino groups, from 1.5 to 10% by weight, based on the prepolymer, of urethane groups, and from 1.5 to 10% by weight, based on the prepolymer, of urea groups;
    (B) from 24 to 1% by weight, of a polyisocyanate having a melting point above 120° C.; and
    (C) from 5 to 69% by weight of an organic or inorganic fibrous material with a fiber length of from 0.1 to 100 mm,
the equivalent ratio between NCO groups, including masked NCO groups, and active H-atoms of components (A) and (B) is between 1:1 and 1:1.75.

14. The process of claim 13, wherein the curing temperature is from 110° to 150°.

* * * * *